May 6, 1930.  E. BARON  1,757,896
AUTOMOBILE WINDOW SCREEN
Filed Sept. 7, 1928  3 Sheets-Sheet 2
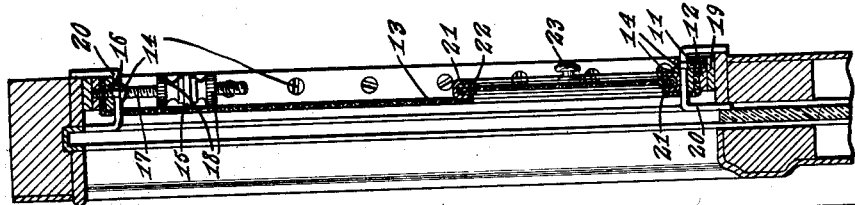
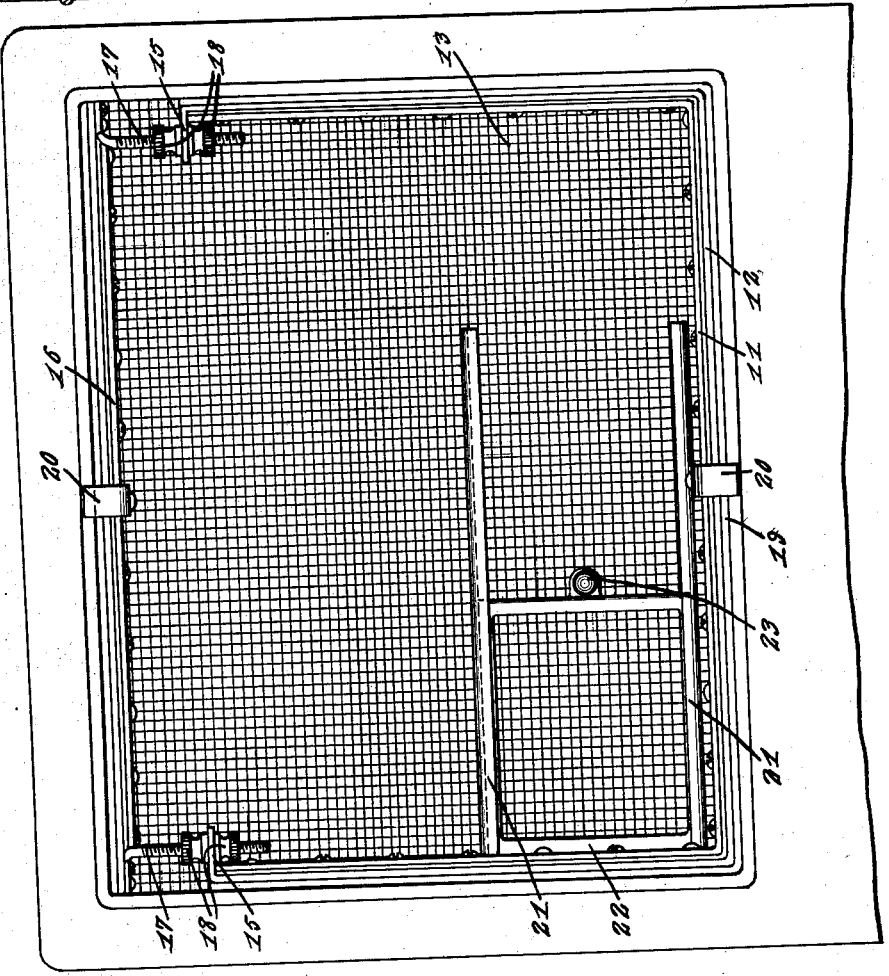
Edna Baron, Inventor
By Victor J. Evans
Attorney May 6, 1930.  E. BARON  1,757,896
AUTOMOBILE WINDOW SCREEN
Filed Sept. 7, 1928   3 Sheets-Sheet 3
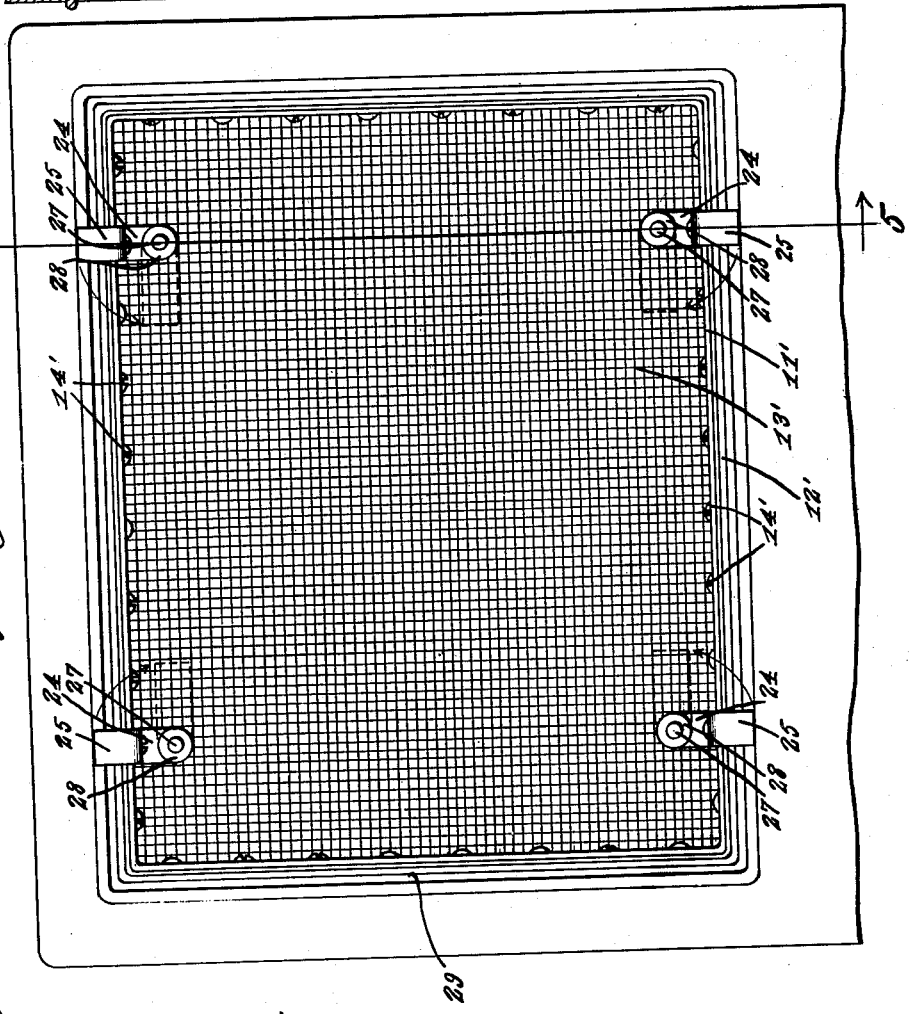

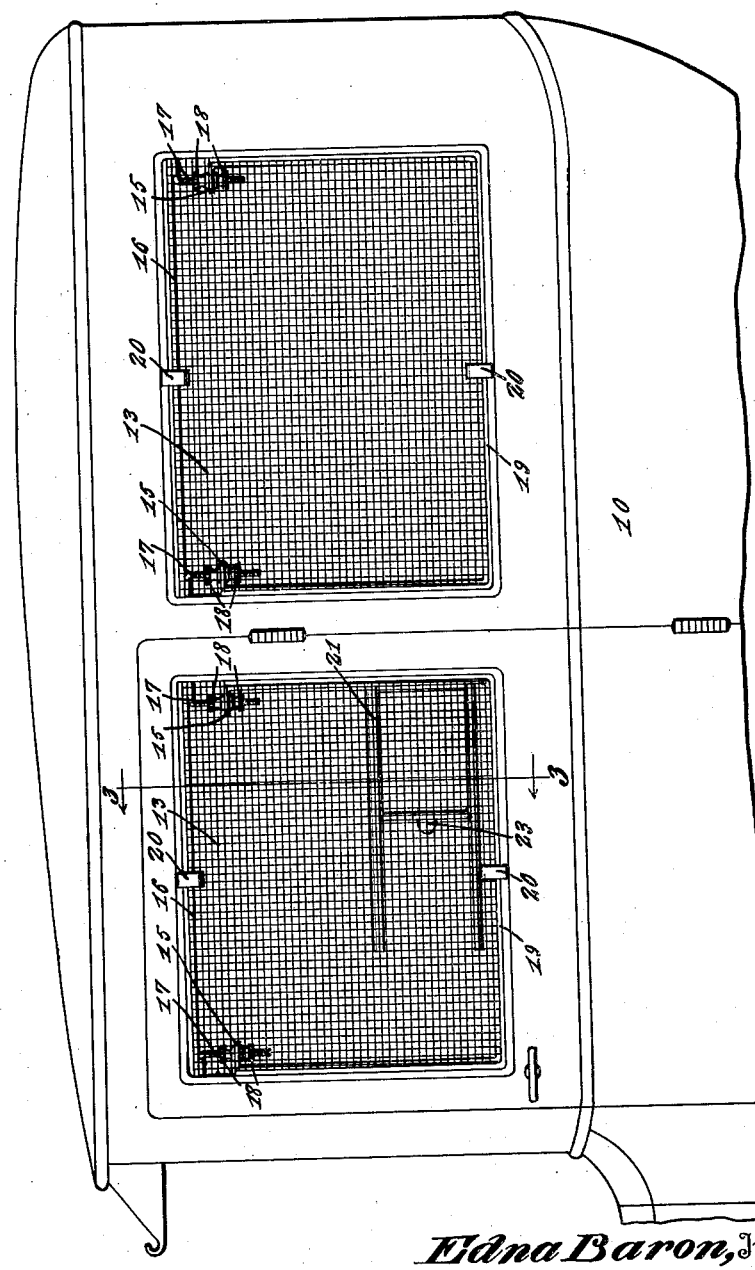

Patented May 6, 1930

1,757,896

UNITED STATES PATENT OFFICE

EDNA BARON, OF CHICAGO, ILLINOIS

AUTOMOBILE WINDOW SCREEN

Application filed September 7, 1928. Serial No. 304,541.

This invention relates to improvements in screens and frames therefor adapted for use within automobiles and other window frames.

An object of the invention comprehends attaching means for the frames.

Another object of the invention contemplates adjusting means for the frames whereby the wire may be kept taut.

An additional object of the invention consists in the provision of a slide door carried by one of the frames adjacent the driver's seat, whereby the driver may readily extend his hand to give a signal.

With the above and other objects in view, the invention further consists in the following novel features and details of construction, to be hereinafter more fully described, illustrated in the accompanying drawings and pointed out in the appended claim.

In the drawings:—

Figure 1 is a fragmentary side elevation of a motor vehicle body illustrating the relative arrangement of the screen frames within the window openings therefor.

Figure 2 is a rear elevation of the screen frame located adjacent the driver's seat.

Figure 3 is a vertical sectional view taken on line 3—3 of Figure 1.

Figure 4 is an elevation of a modified form of screen frame.

Figure 5 is a vertical sectional view taken on line 5—5 of Figure 4.

Figure 6 is a fragmentary perspective view of the adjusting portions of the frame.

Referring to the drawings in detail, wherein like characters of reference denote corresponding parts, the reference character 10 indicates a motor vehicle body having the conventional forms of doors and window openings therefor. As generally known in vehicle body construction a beading or molding surrounds the window openings upon the inner sides thereof and which frequently provide arm rests. These beads or moldings are spaced from the glass whereby the latter may be readily raised and lowered.

The invention consists in the provision of inner and outer frames 11 and 12 respectively adapted for interfitting engagement to grippingly engage the peripheral edges of a screening, such as indicated at 13. Fastening elements 14 are employed for joining the two frames and to prevent displacement of said wire.

As illustrated in Figure 2 of the drawings, the innermost of the screen frames 11 is of substantial U-shape, whereas the outermost frame 12, corresponding in shape but of larger dimensions than the frame 11, terminates to provide inwardly offset ears 15.

A rail 16, having connection with the free end of the screen wire 13, is adapted for connection with the adjacent ends of bolt members 17 having their opposite ends passed through the ears 15. Adjusting elements 18, carried by the bolts 17 upon the opposite sides of the ears 15, are adapted to afford adjustment to the rail 16 to be moved toward and away from the ears 15 when it is desired to support the entire frame within a window opening. The same adjustment is employed for tightening the wire or screening. A layer of felt or other packing, such as indicated at 19, is adapted to entirely surround the completed frame to prevent injury or other defacement of the window opening and molding therefor.

U-shaped clamping members 20, preferably located at intermediate points in the lengths of the inner frames 11 and rail 16, are adapted to pass and repose the opposed legs thereof upon the opposite side edges of the aforementioned window molding.

The particular screen frame employed in the window opening adjacent that of the driver's seat is provided with spaced parallel reversely disposed channel members 21 adapted to slidably mount a frame 22. A knob 23 is included upon one end of the frame 22 to facilitate shifting of the latter to occupy either closed or open positions whereby the driver of the vehicle, after shifting the frame 22 to occupy an open position, may extend his hand through the opening to give a signal to motorists approaching him in either direction.

In Figures 4 and 5 of the drawings, I have illustrated continuous inner and outer frames 11' and 12', respectively, which are adapted to retain the marginal edges of a screen wire 13' therebetween, fastening elements 1~0

14' being employed for joining the frames. In the modification no provision has been made for the adjusting of the wire to keep the latter taut. The wire in this instance is to be stretched very tightly in the first instance and does not require any loosening to facilitate application of the frames therefor.

The attaching mechanism for the modification embodies that of L-shaped plate members 24 carried upon the innersides of the innermost frames 11' and which terminate to provide outwardly projecting flange portions 25 adapted to engage the innerside edges of the window molding.

Plate members 26 located upon the outer sides of the screen 13' are eccentrically connected with bolt members 27 which are also passed through the longer legs of the L-shaped plates 24. Adjusting elements 28, carried by the bolts 27, are adapted to cause the plate 16 to frictionally engage the outer sides of the screening and the corresponding outer side edges of the window molding, substantially as illustrated in Figure 5 of the drawings. A lining or packing, such as indicated at 29, is also employed upon the outer marginal edges of the frame member 12' to engage the aforementioned window molding to prevent defacement thereof.

The invention is primarily adapted for use at night to prevent ingress of light bugs and other insects within the tonneau of the vehicle but said screens may be left in place to keep out dust to a large extent and as illustrated in Figures 3 and 5 of the drawings, wherein sectional views are taken through both the preferred and modified forms of the invention, the window glass may be raised and lowered unrestricted by the presence of the invention.

The invention is susceptible of various changes in its form, proportions and minor details of construction, and the right is herein reserved to make such changes as properly fall within the scope of the appended claim.

Having thus described the invention, what is claimed is:—

A screen frame comprising inner and outer frames, means joining the marginal edges of a screening therebetween, ears formed upon one of the frames disposed in parallelism to the companion frame, adjusting elements carried by the companion frame having connection with the ears to expand and contract the assembled frame within a window opening, and U-shaped clamping members carried by the frames engageable with a window construction to retain the completed frame against displacement.

In testimony whereof I affix my signature.

EDNA BARON.